United States Patent
Rigney (10) Patent No.: US 10,706,479 B2
(45) Date of Patent: Jul. 7, 2020

(54) IDENTIFYING AND CATEGORIZING PURCHASES

(71) Applicant: HRB Innovations, Inc., Las Vegas, NV (US)

(72) Inventor: Nathan K. Rigney, Prairie Village, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 412 days.

(21) Appl. No.: 15/496,731

(22) Filed: Apr. 25, 2017

(65) Prior Publication Data

US 2018/0308179 A1    Oct. 25, 2018

(51) Int. Cl.
*G06Q 40/00*    (2012.01)

(52) U.S. Cl.
CPC ................. *G06Q 40/123* (2013.12)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | | |
|---|---|---|---|---|
| 7,548,915 B2 * | 6/2009 | Ramer | ................ | G06Q 30/0243 705/14.54 |
| 7,778,933 B2 * | 8/2010 | Robinson | ........... | G06Q 20/4014 705/64 |
| 8,280,143 B1 * | 10/2012 | Klieman | ............ | G06K 9/00469 382/137 |
| 8,694,395 B2 * | 4/2014 | Houseworth | .......... | G06Q 10/10 705/31 |
| 8,706,580 B2 * | 4/2014 | Houseworth | .......... | G06Q 10/10 705/31 |
| 2012/0221446 A1 * | 8/2012 | Grigg | ..................... | G06Q 30/04 705/30 |
| 2013/0198047 A1 * | 8/2013 | Houseworth | ........ | G06Q 40/123 705/31 |
| 2014/0108213 A1 * | 4/2014 | Houseworth | .......... | G06Q 10/10 705/31 |
| 2016/0027128 A1 * | 1/2016 | Pandipati | ............... | G06Q 40/00 705/33 |
| 2016/0078566 A1 * | 3/2016 | Farrell | ................... | G06Q 40/12 705/30 |

OTHER PUBLICATIONS

Rettig, "A Fresh Start for Struggling Taxpayers", Journal of Tax Practice & Procedure, Jun. 2011.*
James Bailey, "Fraud and related-party transactions", Internal Auditor, Jun. 2006.*

* cited by examiner

*Primary Examiner* — Frantzy Poinvil
(74) *Attorney, Agent, or Firm* — Erise IP, P.A.

(57) ABSTRACT

Discovering and categorizing individual purchases associated with a user is described. Exemplary steps include acquiring access to a repository; identifying, from within the repository, an electronic receipt; identifying, from within the electronic receipt, at least one line item; acquiring a set of user information; predicting, based at least in part on the set of user information, whether the line item falls within a certain category; and storing, if the line item falls within the certain category, the line item such that information associated with the line item is retrievable.

19 Claims, 4 Drawing Sheets

RetailStoreXYZ
800.555.5555

Retail Store XYZ #650
13555 S. Main St.
Anytown, USA
(555)555-1234

| | | |
|---|---|---|
| Date | 04/17/2017 | 8:38 PM |
| Version | 16.9.3 | |
| Store | 650 | |
| Register | 1 | |
| Transaction # | 7266 | |
| Employee | 781526 | |

SALE

| Product ID | Description | Total | |
|---|---|---|---|
| 765383 | Appointment Calendar | 4.99 | SS |
| 461024 | Candy | 4.99 | SS |

| | |
|---|---|
| Subtotal: | 9.98 |
| Sales Tax: | 0.95 |
| Total: | 10.93 |
| Credit Card 0767: | 10.93 |

AUTH CODE      017410R
TDS    Chip Read
AID    A0000001225350          Discover Credit
TVR    0000008000
CVS    No Signature Required

JONATHAN DOE 1652542576

Please create your online rewards account at retailstore.com/rewards. You must complete your account to claim your rewards and view your status.
Shop online at www.retailstore.com

WE WANT TO HEAR FROM YOU!
Participate in our online customer
survey and receive a coupon for

**$10 off your next qualifying
purchase of $50 or more on
office supplies, furniture and more.**

(Excludes Technology. Limit 1 coupon per household/business.)

IDENTIFYING AND CATEGORIZING PURCHASES

BACKGROUND

1. Field

Embodiments of the invention relate to the identification and categorization of purchases made by a user.

2. Related Art

Various purchases may have implications for taxation, accounting, and other purposes. Prior art systems have attempted to categorize these purchases by accessing financial information indicative of a retailer and an amount paid. The categorization is then based upon the retailer and whether that retailer is commonly associated with the category. This method is imprecise because users will often purchase numerous different items of various categories from a single retailer. Relying solely on the retailer name is therefore an inadequate categorization method. Other prior art systems require users to manually upload receipts and manually adjust for nonbusiness expenses included in the purchase. These systems are burdensome on the user, require manual tracking of the receipts, and require a large knowledge base as to whether the item fits within the category.

Unlike most sources of income, business expenses are not reported on information documents. Instead, business owners and employees must track deductible expenses using a spreadsheet or, at best, by snapping pictures of the receipts for later manual review. The taxpayer must identify any items on the receipt that were personal expenses and make a manual adjustment before completing the tax return. This is also burdensome on the taxpayer.

SUMMARY

Embodiments of the invention solve the above-mentioned problems by providing a system, a computerized method, and a computer program for categorizing purchases by analyzing receipts, such that individual product and service purchases can be analyzed and categorized individually. In embodiments of the invention, the system identifies item descriptions on digital receipts and determines whether the item is a business or personal expense. In this way, the system may augment existing accounting and tax preparation software. This is a solution designed for the receipts-in-a-shoebox taxpayer and the freelancers who comingle business and personal funds. As receipts are more commonly sent to an email address instead of physically printed, this solution will become a standard component of DIY accounting and tax prep software.

Some embodiments of the invention are directed to one or more non-transitory computer readable storage media storing computer-executable instructions that discover and categorize purchases associated with a user, wherein execution of the computer-executable instructions by at least one processing element performs the following steps: acquiring access to a repository; identifying, from within the repository, an electronic receipt; identifying, from within the electronic receipt, at least one line item; acquiring a set of user information; predicting, based at least in part on the set of user information, whether the line item falls within a certain category; and storing, if the line item falls within the certain category, the line item such that information associated with the line item is retrievable.

Other embodiments of the invention are directed to a non-transitory computer readable storage medium storing computer-executable instructions that discover and categorize purchases associated with a user, wherein execution of the computer-executable instructions by at least one processing element performs the following steps: acquiring access to a repository; identifying, from within the repository, an electronic receipt; identifying, from within the electronic receipt, at least one line item; acquiring a set of user information indicative of an occupation or field of business that is associated with the user; predicting, based at least in part on the occupation or field of business, whether the line item falls within a business expense category; and storing, if the line item falls within the business expense category, the line item such that information associated with the line item is retrievable.

Still other embodiments of the invention may be directed to a computerized method of implementing the above-discussed steps. Still other embodiments of the invention may be directed to a system that comprises a server and a user device. The server is configured to receive information from the user device indicative of at least one receipt or line item and then perform the discussed steps to categorize the at least one line item.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a computer program, a method, and a system for identifying and categorizing purchases. A purchase may include any good or service for which something of value is exchanged. The purchase may be notable for future activities, such as the preparation of a tax return, if the purchase falls into a certain category (which may be prescribed by law, regulation, or other rule). Embodiments of the invention therefore categorize these purchases and stores this information for later use.

Figure 1:
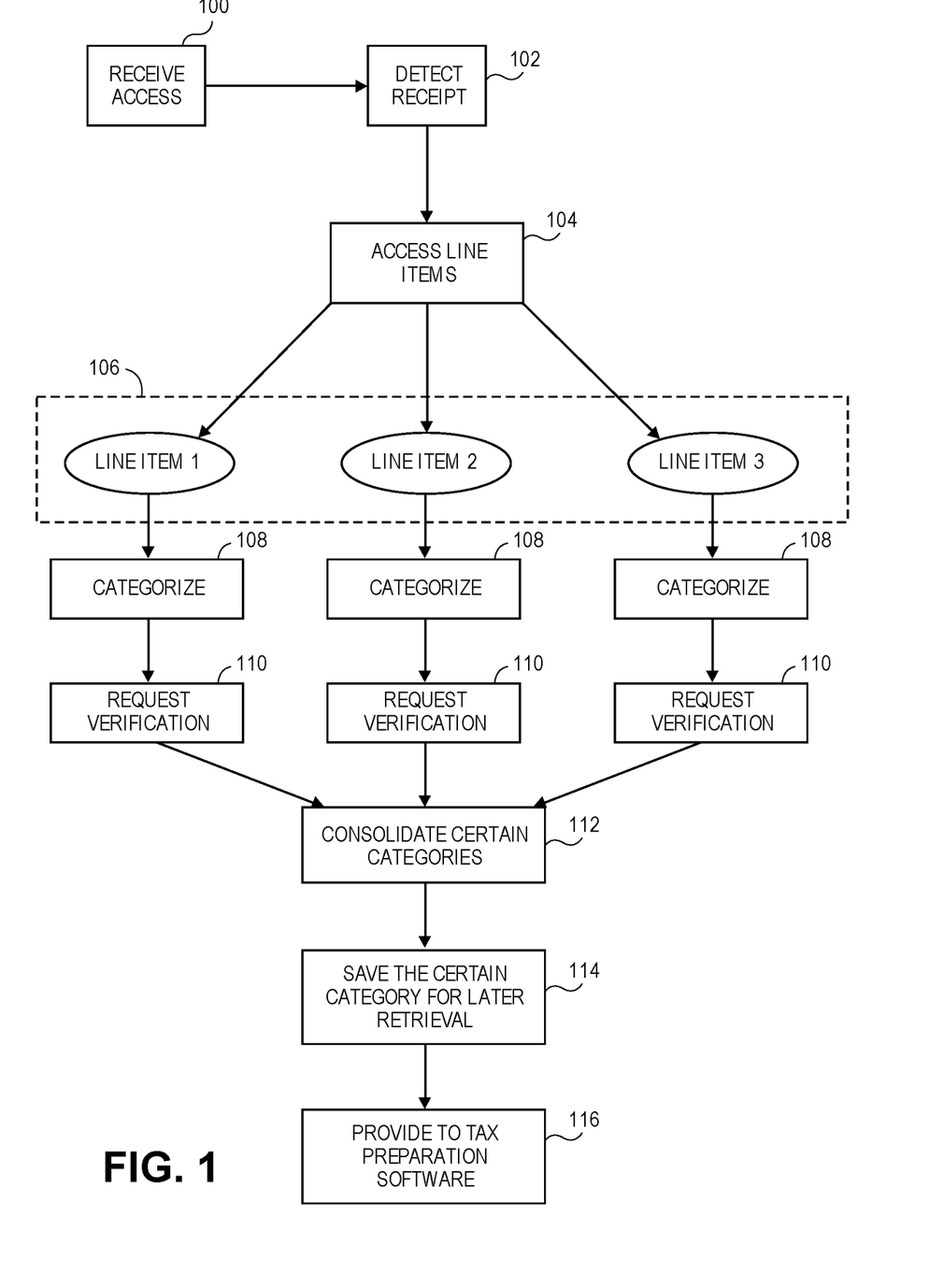
FIG. 1 is a flow diagram of an exemplary embodiment of the invention that identifies and categorizes purchases.

Turning to the figures, FIG. 1 presents an exemplary flow diagram illustrating various steps of embodiments of the invention. Generally, the system receives or otherwise acquires access to a set of information, such as an e-mail account or retailer account. The system will then detect receipts or other sales records and identify individual line items associated with each. The system will categorize the line items and may ask for verification of the categorization. The system will then store the categorized line items such that they may be later accessed. For example, this later access may be performed by a tax preparation program, and the categorized line items correspond to various tax-significant categories to assist the tax preparation program with correctly claiming the items.

In Step 100, the system receives access to a set of information. The set of information may include one or more receipts, or other purchase records, that may be used for the categorization of the individual items purchased. These individual items or services are referred to herein as "line items." A "line item" is a good, service, donation, or other purpose for which money is sent. As some line items may be relevant to taxation or other financial purposes, these line items will be identified and categorized as discussed below.

The set of information may be any repository or data store that has, or may have receipts. One example of this repository may be an e-mail account that may include e-mails indicative of receipts. Another example of this repository may be a retailer account that may have information indicative of the purchases made by the retailer from that specific retailer. The user may provide a user name and password, or other credentials, to the repository. The user may also log into the repository directly via an electronic resource.

This access to the repository may be an ongoing permission, such that embodiments of the invention will periodically or continuously monitor for new information, or may be for a single instance, such as at the beginning of the tax return preparation process. In embodiments of the invention, ongoing permission may be preferred because the request verification discussed below may then be presented to the user at a time closer to when the purchase was made. This may allow the user to more clearly recall the purchase and verify the categorization. For example, some categories may depend at least in part on the time or location of the purchase. By verifying soon in time after the purchase, the user may be able to recall the surrounding circumstances of the purchase more clearly.

In some embodiments, the repository may be the camera information on a smart phone or scanned information associated with a computer. The user may therefore use their smart phone to take a picture of physical receipts and/or use a scanner to scan receipts into a computer. Embodiments of the invention will then perform the other discussed steps for these photographed or scanned images. This may include using optical character recognition (OCR) technology to general computer-readable text from the images.

In some embodiments, the repository may be across numerous of the discussed and other locations. For example, some embodiments of the invention may take the form of a smart phone application (app) configured to be installed on a user smart phone. The smart phone app may run in the background or periodically run. The smart phone app may have access to the user's e-mail that is on the phone, the user's camera and photograph information, the user's retailer accounts (which may have corresponding apps on the smart phone), the user's accounting app, and other apps that may include purchase records. The smart phone app may therefore be able to access receipts and other purchase records across these various platforms so as to be more likely to capture relevant information.

In Step 102, the system detects a receipt or other purchase record from within the repository. The system may detect a receipt by analyzing the information within the repository to identify at least one potential receipt. The system may detect receipts by crawling or searching for certain keywords such as "order," "shipped," "purchase," and/or "receipt." The system may additionally or alternatively identify receipts by analyzing the sender or other associated party. For example, certain entities may be known to be retailers, so information related to these known retailers may be more likely to be a receipt.

Figure 3:
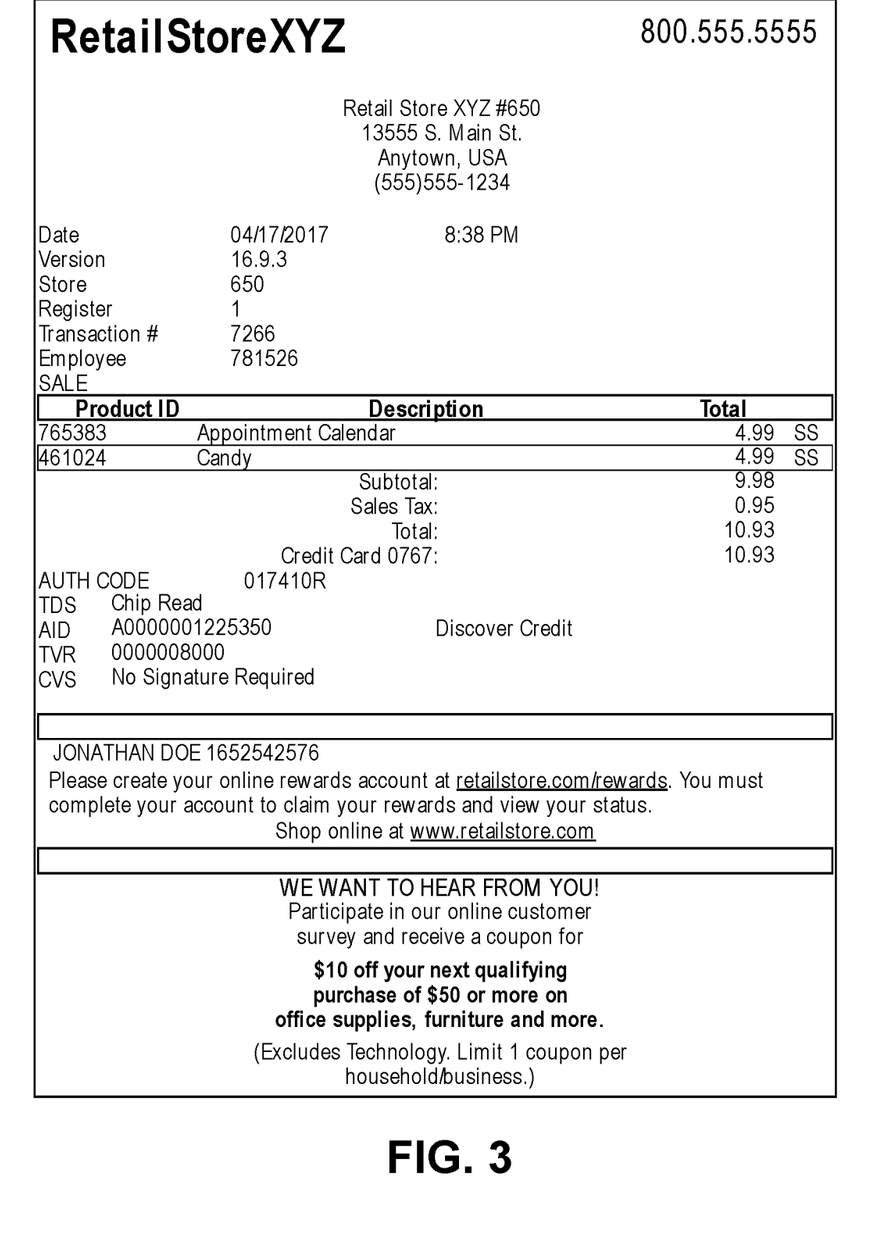
FIG. 3 is an exemplary diagram showing an electronic receipt that may be utilized by embodiments of the invention.

An example receipt is shown in FIG. 3. The example receipt shows a retailer name, a retailer address, a date, contact information for the retailer, and payment information. The example receipt further shows the individual line items that were purchased by the user. The example receipt lists, for each line item, a product identification number, a Description, and a price total for that line item. The product identification number may refer to a universal product code or other product-specific number. The product identification number may be used by embodiments of the invention to access more information about the purchased good or service to better categorize that purchase. The description provides a text string that provides a general description of the product or service. The description may include a brand name, a model name, a size, a type, or other information about the good or service. The price is also listed, which may be per unit or total for that line item. Taxes paid (such as sales tax) will be listed separately for most types of goods and services. Based upon the category used below, the amount paid in sales tax (or other taxes) may be included in the amount of the line item or may be excluded.

In Step 104, the system detects and identifies individual line items from the receipt. Individual line items represent discrete items purchased, services hired, etc., as discussed above. The individual line items may be identified based upon their location on the receipt, certain key words appearing in the line items, their location relative to other words or phrases on the receipt etc. For example, the system may identify the prices by identifying numeric sequences with two digits following a decimal. Upon identifying prices, text strings in the same line may be identified as the individual line items. Other lines, such as a subtotal, tax, and total amounts may be excluded.

In Step 106, the line items identified are analyzed to determine information about the related good or service that is associated with that line item. In some embodiments, this step may be performed by acquiring more information about the line item by searching for the product identification number, the description, and other information on the receipt. In some embodiments, this step may include comparing the line item description to other descriptions utilized in previous iterations of the invention, or appearing on other receipts that are available to the system (such as to the user or other users). In some embodiments, this step may include accessing a data store or repository associated with the retailer to identify further information about the line item.

In Step 108, the system categorizes each line item. The category that is used may depend on the purpose for which the instance of the invention is being performed. For example, if the invention is being utilized for tax reasons, the categories may be business expenses and non-business expenses. As another example, the categories may be travel expenses and non-travel expenses. As yet another example, the categories may be charitable donations and non-charitable donations. The specific sub-steps in categorizing the individual line items are discussed in more detail below.

In Step 110, the system requests confirmation from the user that the line item has been categorized successfully and correctly. The confirmation presented to the user may be a single confirmation for the entire receipt, an individual confirmation for each line item, an individual confirmation for each category, or other configuration. The system may then receive confirmation from the user that the categories were assigned correctly. Alternatively, the user may provide a correction indicative that at least one item was incorrectly categorized.

In Step 112, the system consolidates those line items that fall within certain categories. Because only certain categories may be relevant to the intended purpose of the specific iteration of the invention, other categories and their associated line items may be disregarded, deleted, or separately stored. For example, the system may consolidate all line items that have been identified as business expenses.

In Step 114, the system saves, stores, or otherwise retains at least those line items that fall within the certain category. The system may store this information in a user account, as discussed below, in a remote data store, locally on the client device, or in another location or manner. Upon successive iterations of the invention, new line items may be added to the existing total for the specific category that is stored. In this way, the user may be able to access (or be presented with) a current total for that category. This may be relevant to the user as certain categories may be capped or a have a floor that are relevant to their implementation.

In Step 116, the system provides these line items to a tax preparation system or otherwise saves them in a location which may be accessed by the tax preparation software. For example, the system may save the information in a client tax account that is associated with the client and hosted by a tax professional. Upon beginning the tax return preparation process, the tax preparation system or tax professional may retrieve the information for use in preparing the tax return. The information may then be input, either directly or indirectly into the tax return. An example of an indirect input is that a total of all line items within that category may be input into the tax return preparation program. The tax preparation system may then use these total amounts for each category (among other information) to prepare a tax return for the subject taxpayer.

The subject taxpayer may include any entity, either a legal or natural person, that files a tax return with a government taxing authority. The subject taxpayer may also be a married couple or other plurality of individuals filing a single tax return. Taxes to be paid can be United States Federal Income Tax, income tax for the various states within the United States, corporate taxes, partnership taxes, LLC taxes, property taxes, tariffs, or other taxes. Typically, the subject taxpayer provides information relevant to themselves and the amount of tax owed in the form of the tax return (based upon incomes, expenses, and the like). The tax return may therefore include information indicative of the employer and/or a field of employment to which the subject taxpayer is or may be associated.

The computer program receives information about the subject taxpayer. In one embodiment, the subject taxpayer brings physical copies of his tax-related documents, such as W2s and 1099s, to the tax preparer. A tax preparer then enters information from the tax-related documents into a tax preparation computer program. In another embodiment, the subject taxpayer enters information from the tax-related documents into tax preparation software. The tax preparation computer program may be the same as or interface with the computer program of embodiments of the invention. In addition, the subject taxpayer answers questions related to his taxes, either verbally to the tax preparer or by inputting into the computer program. This additional information may be used to supplement and add to the information stored by embodiments of the invention in Step 114.

The tax return is essentially a report filed with the appropriate government taxing authority, such as the Internal Revenue Service in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the subject taxpayer or tax preparer calculates the taxes due. To assist in the calculation and to allow the taxing authority to verify the calculations, the tax return contains pertinent information associated with the subject taxpayer for the tax year. The tax return can be either written, digital, or a combination of both. In other embodiments, information relevant to the subject taxpayer and the tax to be paid are provided on other various forms and documents, such as a Form W2 or a Form 1099.

In embodiments of the invention, in Step 100 the system may also receive or otherwise acquire tax returns from previous years and/or relevant to other taxing authorities for the current and/or previous years, financial records, and bank statements. In some embodiments, all of the information is received by the computer program as a single set. In other embodiments, the computer program may query the user to input additional information. The subject taxpayer may also provide information to the system that the tax preparer does not have access to, such as financial records and bank statements.

In embodiments of the invention, the invention is utilized by a tax professional. The tax professional includes any entity, either a legal person or natural person, or a computer program adapted to preparing taxes or providing other financial services. Examples of tax professionals include, but are not limited to, the following: a company, such as H&R Block, Inc.®, or an employee or agent of such a company; software adapted to prepare tax returns or other financial documents; and a person, legal or natural, who advises or assists the taxpayer in preparing their own tax return. The tax professional may also comprise a database for storing at least a portion of the set of taxpayer information, a data store of common items for each category (shown in FIG. 2), a retailer profile (which may include item offerings and descriptions) and other relevant information.

In other embodiments of the invention, the invention is utilized by a financial professional. A financial professional includes any entity, either a legal person or a natural person, or a computer program adapted to provide financial services or products. For example, the financial professional could be a financial advisor, accountant, attorney, etc. By way of another example, the financial professional could be a website for monitoring the taxpayer's financial assets and liabilities. The financial professional does not actually prepare, or assist in preparing, the tax return. Instead, the financial professional has access to a completed and/or filed tax return that was prepared by the taxpayer or the tax professional. Embodiments utilized by the financial professional may be a free or pay service provided by the financial professional to clients to help bolster the legitimacy of the clients' tax returns.

In embodiments of the invention, the tax professional and financial professional are the same entity, or are employees of the same entity, or are otherwise associated with each other through, for example, a contractual or business relationship. In some embodiments, there is no financial professional involved. In other embodiments, there is no tax professional involved, such as in an instance where the taxpayer prepares their own tax return. As such, the term "tax professional" or "financial professional" is used throughout to denote either or both the tax professional and financial professional. The financial professional may also act on behalf of either the taxpayer or the tax professional in the discussed steps.

In still other embodiments of the invention, the invention is utilized by a commercial retailer or non-profit organization. The commercial retailer may provide embodiments of the invention as an incentive to users to use their retail services over competitors. By assisting the user in identifying and tracking purchases that may have tax implications (or other implications), the commercial retailer is providing a desired service to their customers. The commercial retailer may also implement embodiments of the invention that are directed to suggesting purchases based upon the categories. For example, the retailer may recommend a certain product or service based upon the known characteristics of the user (as discussed below) and the likelihood that such product or service may be tax deductible.

Figure 2:
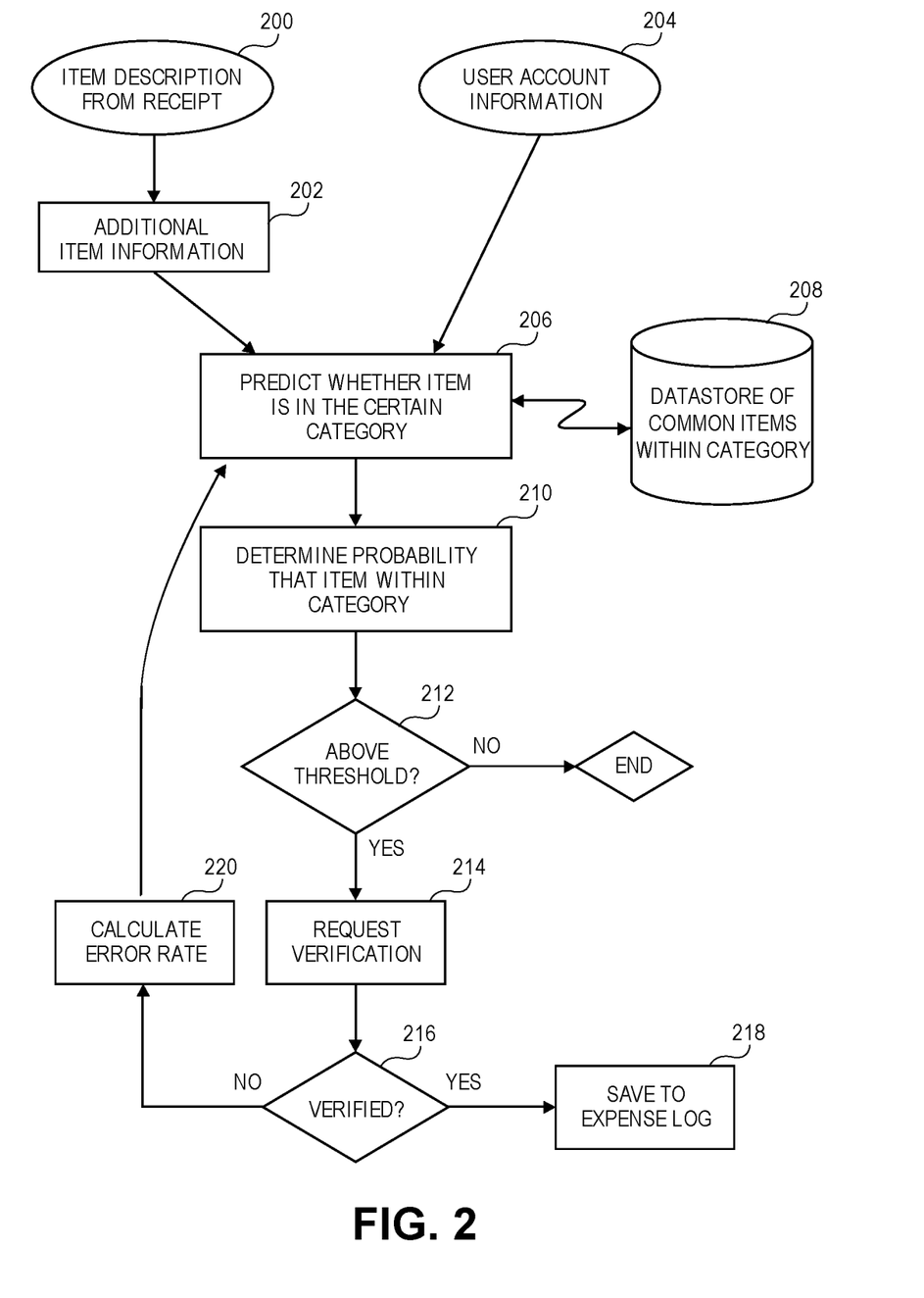
FIG. 2 is a flow diagram of the categorization shown in FIG. 1.

Turning to FIG. 2, a more detailed depiction of the steps of categorizing the line items is shown. Categorizing the line item often depends on the user that is purchasing the line item. This is because categories are often specific to the person. For example, in the category of business expenses for tax purposes, whether or not a line item qualifies as a business expense relies on the user, the user's business, the user's job requirements, as well as customary practices of similarly situated users.

In Step 200, the item description, and other available information, is gathered from the receipt or other purchase record. The item description may be gathered from the repository, as described above, or may be received from another device or system. For example, in some embodiments, the item descriptions may be identified on a user device and sent to a remote server for categorization. This may be due to the complexity of the calculation or the availability of resources and information available at the remote server that are not available at the client device.

In Step 202, additional item information is received, accessed, or otherwise acquired. The additional information may be acquired about the individual line items. This may include determining the use of the product or service, the description of the product, the purpose of the product, a department or section in which the retailer places the item, and other information about the product to assist in determining whether the product will fit within the category. This may include comparing the line item information against other receipts or other identified line items in previous iterations of the invention.

In some embodiments, this step is not performed, as the description itself may be sufficient to properly perform the latter steps. In other embodiments, this step may only be performed if the below-determined probability that the line item has been correctly categorized is below the certain threshold, or upon the user denying verification that the categorization was performed correctly.

In Step 204, the system accesses user account information or other information about the user and/or the subject taxpayer. In some embodiments, this information may be previously existing, such as in a client tax preparation account. In other embodiments, this information may be requested upon the user initially setting up an account to use the invention. For example, the system may query the user upon setup as to their business and employment fields, as well as the business and employment fields of others in their household. The system may then use this information as the user information.

Because the categorization is often based upon the characteristics of the particular user and/or subject taxpayer, information about that user and/or subject taxpayer is relevant to determining the categorization. Some line items may be business expenses for some, but not for others. For example, the system may determine, or receive information, that persons engaged in the field of freelance web design may have certain business expenses such as computer accessories, printer ink, printer paper, and file folders. In contrast, persons engaged in the field of lawn maintenance may have certain business expenses such as fuel, work gloves, yard equipment, chemicals, and the like. The business field is therefore relevant to the determination of whether the line item is a business expense. The system may also access or retain a more individualized user information about the user's specific business or employment, instead of relying on a more general field.

In Step 206, the system predicts whether the line item is within the certain category. The system may perform this step by comparing the occupation information for the user, the item description, and a database of common expenses for that occupation (as discussed below). The database of common expenses may be generic for all persons of that general occupation, specific to the particular user (based upon more specific information about the occupation and/or past iterations of the invention (e.g., based on previously identified purchases for that user).

Information considered in determining the categorization may include item descriptions, price, tax, vendor, date, and other information related to the line item and/or the user. Item descriptions are input into the machine learning model which cross references the line item with the user's occupation (from profile) and items in the common business expense database. The model then determines the probability that the receipt item is a business expense.

In some embodiments, this step can be accomplished by using unique parameters in a recurrent neural network seeded with a database of common business expenses tailored to the individual's occupation or industry. Parameters include user's occupation and receipt item descriptions, among other information. The network will be trained by the user, and other similar users, as business expenses identified by the network are either verified or denied by the user.

In Step 208, the system accesses a data store of common items within the category. This step may be performed as a sub-step of Step 206 or prior to Step 206. The data store of common items may include items that are commonly assigned to the category for a particular job, occupation, business, field, vocation, or the like. The selected occupation or occupations is done by accessing the user account to determine an occupation, presenting the user with options to select, querying the user for the information, determining the occupation based upon other information sources, or by another method of learning the occupation.

In some embodiments of the invention, a machine learning model will consult a database of business expenses organized by occupation and vendor to determine the probability of whether a particular receipt item is a business expense. Business expenses organized by occupation can initially be procured by the tax professional or by the system. In some embodiments, all or some of the user-verified business expense item descriptions are saved to the database. Thus, the database becomes more valuable and accurate as usage increases. Over time, the model may become personalized for each user based on user behavior. This allows for a lower error rate over time.

In Step 210, the system determines a probability that the line item actually falls within the predicted category. The probability may be based upon a degree of certainty that the item description matches a corresponding item description in the database of common expenses, a degree of certainty that the user occupation matches the user's actual occupation, a degree of certainty surrounding the various circumstances of the purchase, and other considerations. For example, some purchases may be considered business expenses based upon the time and/or location of their purchase. For example, certain business meals may be tax deductible (at a fifty percent rate) assuming that the meal meets various criteria.

In Step 212, the system compares this probability to a threshold. In embodiments of the invention, if the probability is below the threshold, the system may end the process as to that line item. For example, if the probability that the line item is a business expense is below a certain low threshold, the system may presume that it is not a business expense and not query the user for a verification. This is because there may be many line items and individual confirmations may be burdensome on the user. However, if the probability is above the threshold, the system may determine that the line item is worthy of query to the user. In other embodiments, the system may query the user to confirm all line items.

In Step 214, the system requests verification from the user that the line item was categorized correctly. The verification may present the line item and the determined categorization. The verification may also present or otherwise allow for user input to provide the verification. For example, the user may select a button on the screen to select the category, or the user may speak aloud allowed the verification (to be interpreted by a voice recognition program or function).

In some embodiments, the system may present supplemental information to the user along with the request for verification that helps the user make an informed verification decision. The supplemental information may include information related to the category (including information related to the rules or regulations associated with the category), information related to the line item (to aid the user in recalling the line item and/or verify that the determined information is correct), and/or information related to the user's occupation (which may include information related to common business expenses related to that occupation).

It should be appreciated that in many instances the user will not know whether the line item is a business expense without this supplemental information. The user may also incorrectly assume that the line item is a business expense without knowing the detailed rules and regulations that govern business expenses. The system may therefore select a portion of the regulation that is most relevant to the determination of the categorization and present or emphasize this information for the user. For example, certain business related meals may be tax deductible as long as business was discussed at the meal. The system may therefore present a query to the user regarding whether business was discussed at the meal. Based upon the received information, the probability that the line item fits within the category may be increased or the prediction step discussed above in Step 206 may be performed again. In some instances, this query for additional information may be presented during Step 206.

In Step 216, the system receives the verification from the user. If the user approves of the categorization, in Step 218 the system saves the information to an expense log or other data store (such as discussed above in FIG. 1). The system may additionally save the information to the data store of common items. As such, future iterations of the invention will include the item, and other similar items, as being a common deduction for both the user and others in the same or similar occupations. This allows the system to become more accurate and efficient over time.

If the user does not approve of the categorization, in Step 220 the system may calculate an error rate and perform other self-correcting steps. The system may then return to predict the category or may accept the user's correction as accurate.

Figure 4:
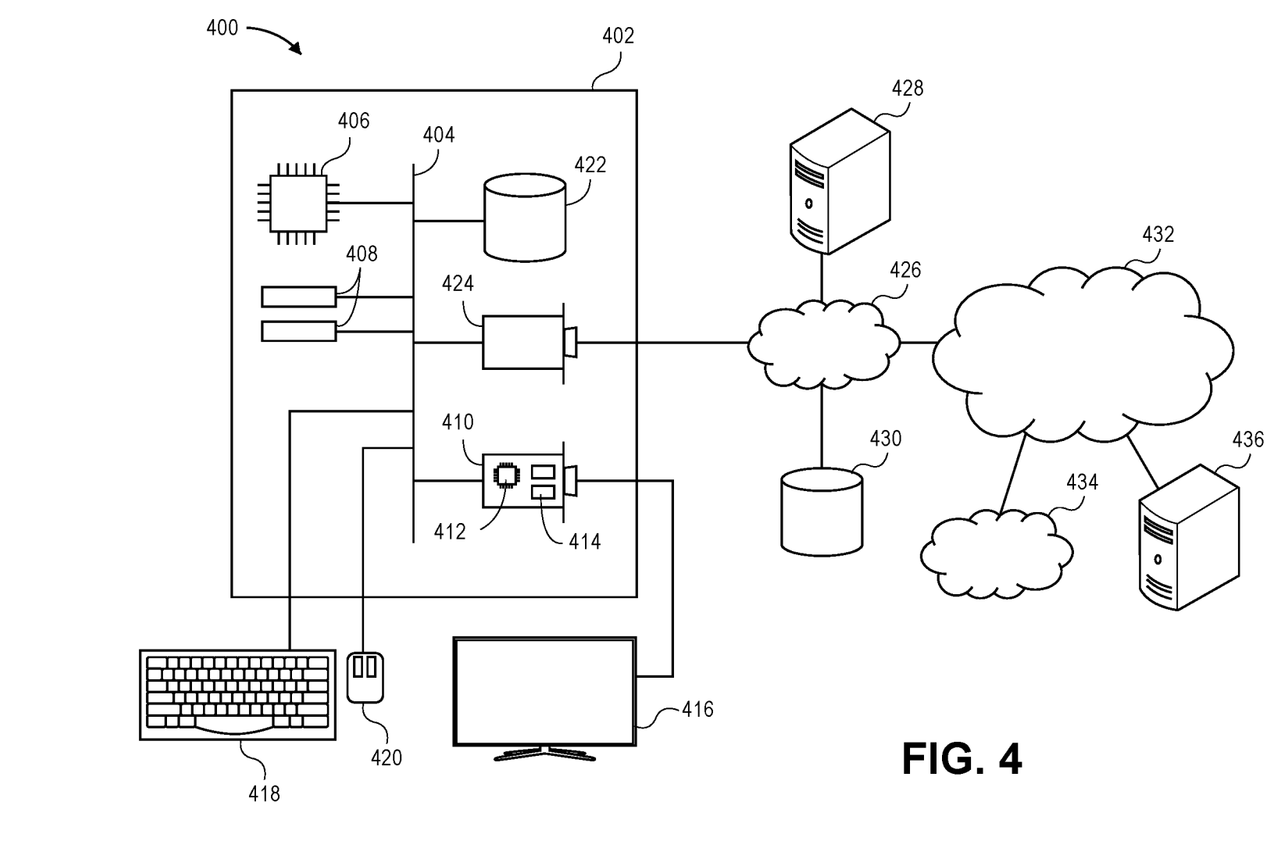
FIG. 4 is a system diagram of an embodiment of the invention depicting various computing devices and their components.

Turning to FIG. 4, the specific components of the system 400 will now be discussed. An exemplary hardware platform for certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over Internet 442. Local network 426 is in turn connected to Internet 432, which connects many networks such as local network 426, remote network 434 or directly attached computers such as computer 436. In some embodiments, computer 402 can itself be directly connected to Internet 432.

The system may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-alone computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the user may be provided with a taxpayer account that permits the taxpayer to access embodiments of the invention that are applicable to accessing receipts and storing the determined categorization information. Additionally, a retailer may be provided with a retailer account that permits the retailer to access embodiments of the invention that are applicable to reporting information related to sales receipts and information related to various line items. Additionally, the tax preparer may be provided with a tax preparer account, through which he can monitor the determined categorized items to the subject taxpayer. In addition, any number and/or any specific types of account are provided to carry out the functions, features, and/or implementations of the invention. Upon the taxpayer, retailer, and/or tax preparer logging in to the electronic resource for a first time, they may be required to provide various pieces of identification information to create their respective accounts. Such identification information may include, for instance, personal name, business name, email address, phone number, or the like. Upon providing the identification information, the subject taxpayer, retailer, and/or tax preparer may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer readable storage media storing computer-executable instructions that discover and categorize purchases associated with a user, wherein execution of the computer-executable instructions by a computer system having one or more processing elements performing the following steps:
   acquiring, by at least one of said processing elements, access to a repository;
   identifying, by at least one of said processing elements, from within the repository, an electronic receipt;
   identifying, by at least one of said processing elements, from within the electronic receipt, at least one line item;
   acquiring, by at least one of said processing elements, a set of user information indicative of an occupation or field of business that is associated with the user;
   predicting, by at least one of said processing elements, based at least in part on the set of user information, that the line item falls within a certain category; and
   storing, by at least one of said processing elements, the line item that falls within a certain category such that information associated with the line item is retrievable;
   using a tax preparation program to retrieve the stored information including the certain category; and
   filing a tax return associated with the user including the stored information.

2. The one or more non-transitory computer readable storage media of claim 1, wherein the repository is an e-mail account associated with the user.

3. The one or more non-transitory computer readable storage media of claim 1, wherein the repository is a retailer account associated with the user.

4. The one or more non-transitory computer readable storage media of claim 1, wherein the electronic receipt is a purchase record indicative of a purchase of at least one good or service.

5. The one or more non-transitory computer readable storage media of claim 1, wherein execution of the computer-executable instructions by at least one processing element further performs the following steps:
   accessing a data store of common items within the certain category; and
   storing the line item in the data store of common items such that it is associated with the certain category.

6. The one or more non-transitory computer readable storage media of claim 5, wherein the certain category is business-related expenses.

7. The one or more non-transitory computer readable storage media of claim 6, wherein the stored information is utilized by the tax preparation program to deduct the business-related expenses from a taxable income amount.

8. The one or more non-transitory computer readable storage media of claim 1, wherein execution of the computer-executable instructions by at least one of said processing elements further performs the following steps:
   presenting, to the user via a graphical user interface, information indicative of the line item and the certain category; and
   presenting, to the user via the graphical user interface, an option to verify that the line item belongs within the certain category.

9. The one or more non-transitory computer readable storage media of claim 8, wherein execution of the computer-executable instructions by at least one of said processing elements further performs the following step:
   calculating a probability that the line item is within the certain category,
   wherein the step of presenting an option to verify is only performed if the calculated probability is above a threshold.

10. The one or more non-transitory computer readable storage media of claim 8, wherein execution of the computer-executable instructions by at least one of said processing elements further performs the following step:
   presenting, to the user via the graphical user interface, a set of supplemental information to assist the user in making an informed decision as to verification,
   wherein the set of supplemental information that is presented to the user includes at least one of: information related to the certain category, information related to the line item, and information related to common expenses for the certain category.

11. One or more non-transitory computer readable storage media storing computer-executable instructions that discover and categorize purchases associated with a user, wherein execution of the computer-executable instructions by a computer system having one or more processing elements performing the following steps:

acquiring, by at least one of said processing elements, access to a repository;

identifying, by at least one of said processing elements, from within the repository, an electronic receipt;

identifying, at least one of said processing elements, from within the electronic receipt, at least one line item;

acquiring, by at least one of said processing elements, a set of user information indicative of an occupation or field of business that is associated with the user;

predicting, by at least one of said processing elements, based at least in part on the occupation or field of business that is associated with the user, whether the line item falls within a business expense category; and     storing, by at least one of said processing elements, if the line item falls within the business expense category, the line item such that information associated with the line item is retrievable;

using a tax preparation program to retrieve the stored information; and     filing a tax return associated with the user including the stored information.

12. The one or more non-transitory computer readable storage media of claim 11, wherein the repository is selected from a group consisting of an e-mail account associated with the user and a retailer account associated with the user.

13. The one or more non-transitory computer readable storage media of claim 11, wherein execution of the computer-executable instructions by at least one of said processing elements further performs the following steps:

accessing a data store of common items within the business expense category; and     storing the line item in the data store of common items such that it is associated with the business expense category.

14. The one or more non-transitory computer readable storage media of claim 11, wherein the stored information is utilized by the tax preparation program to deduct the line items within the business expense category from a taxable income amount.

15. The one or more non-transitory computer readable storage media of claim 11, wherein execution of the computer-executable instructions by at least one of said processing elements further performs the following steps:

calculating a probability that the line item is within the business expense category;

presenting, to the user via a graphical user interface and upon the calculated probability being above a threshold, information indicative of the line item and the business expense category; and     presenting, to the user via the graphical user interface, an option to verify that the line item belongs within the business expense category;

presenting, to the user via the graphical user interface, a set of supplemental information to assist the user in making an informed decision as to verification,     wherein the set of supplemental information that is presented to the user includes at least one of: information related to the business expense category, information related to the line item, and information related to common expenses for the business expense category.

16. A computerized method for discovering and categorizing purchases associated with a user performed by a computer system having one or more processing elements, the method comprising the following steps:

acquiring, by at least one of said processing elements, access to a repository;

identifying, by at least one of said processing elements, from within the repository, an electronic receipt;

identifying, by at least one of said processing elements, from within the electronic receipt, at least one line item;

acquiring, by at least one of said processing elements, a set of user information indicative of an occupation or field of business that is associated with the user;

predicting, by at least one of said processing elements, based at least in part on the occupation or field of business, whether the line item falls within a business expense category; and     storing, by at least one of said processing elements, if the line item falls within the business expense category, the line item such that information associated with the line item is retrievable by a tax preparation program,     wherein the stored information is utilized by the tax preparation program to complete a tax return that deducts the line items within the business expense category from a taxable income amount; and     filing the tax return associated with the user including the stored information.

17. The computerized method of claim 16, wherein the repository is selected from a group consisting of an e-mail account associated with the user and a retailer account associated with the user.

18. The computerized method of claim 16, further comprising the following steps:

accessing a data store of common items within the business expense category; and     storing the line item in the data store of common items such that it is associated with the business expense category.

19. The computerized method of claim 16, further comprising the following steps:

calculating a probability that the line item is within the business expense category;

presenting, to the user via a graphical user interface and upon the calculated probability being above a threshold, information indicative of the line item and the business expense category; and     presenting, to the user via the graphical user interface, an option to verify that the line item belongs within the business expense category;

presenting, to the user via the graphical user interface, a set of supplemental information to assist the user in making an informed decision as to verification,     wherein the set of supplemental information that is presented to the user includes at least one of: information related to the business expense category, information related to the line item, and information related to common expenses for the business expense category.

\* \* \* \* \*